US007270555B2

(12) United States Patent
Wu (10) Patent No.: US 7,270,555 B2
(45) Date of Patent: Sep. 18, 2007

(54) CAR INTERIOR LED LAMP ADAPTER ELECTRICAL CONNECTOR STRUCTURE

(76) Inventor: Chih Hsien Wu, 2F., No. 196, Sec. 2, Zhong-Xing Road, Hsin-Tien City, Taipei Hsien (TW)

( * ) Notice: Subject to any disclaimer, the term of this patent is extended or adjusted under 35 U.S.C. 154(b) by 0 days.

(21) Appl. No.: 11/481,945

(22) Filed: Jul. 7, 2006

(65) Prior Publication Data
US 2007/0167054 A1 Jul. 19, 2007

(30) Foreign Application Priority Data
Jan. 17, 2006 (TW) .............................. 95201029 U (51) Int. Cl.
*H01R 33/08* (2006.01)
(52) U.S. Cl. ...................... 439/238; 362/800
(58) Field of Classification Search ................ 439/236, 439/638, 649, 695, 646, 342, 345, 346; 362/800, 362/490
See application file for complete search history.

(56) References Cited

U.S. PATENT DOCUMENTS 5,947,588 A * 9/1999 Huang ........................ 362/235
6,595,656 B2 * 7/2003 Yoda .......................... 362/187
6,791,840 B2 * 9/2004 Chun ......................... 361/715
7,014,509 B2 * 3/2006 Devine et al. .............. 439/638
2004/0042208 A1 * 3/2004 Wu ............................ 362/245

* cited by examiner

Primary Examiner—Phuong Dinh
(74) Attorney, Agent, or Firm—Troxell Law Office, PLLC (57) ABSTRACT

A car interior LED lamp adaptor electrical connector structure that includes a base configured and structured to match various car interior lamp socket structure configurations, wherein a female socket of an electrical connecting socket is embedded within the base, and positive and negative electrode pins protrude form a bottom portion of the female socket, which electrically connect to electrode terminals of the base of various forms, thereby fabricating an electrical connector terminal. An LED lamp board is joined to connecting wires and a male socket of an electrical connecting socket, thereby enabling the male socket to connect to a female socket of an electrical connecting socket. Then, the electrical connector terminal can be assembled and connected to a car interior lamp socket, thus forming an electrical connection and emitting of light, and thereby providing the present invention with the advantage of use with the majority of car interior lamp sockets.

12 Claims, 11 Drawing Sheets

CAR INTERIOR LED LAMP ADAPTER ELECTRICAL CONNECTOR STRUCTURE

BACKGROUND OF THE INVENTION (a) Field of the Invention

The present invention relates to a car interior LED (Light Emitting Diode) lamp adaptor electrical connector structure, and more particularly to an electrical connector terminal structure designed to accord with configuration of a car interior light socket structure, which enables the electrical connector terminal to convert a car interior lamp into an LED lamp.

(b) Description of the Prior Art

Tungsten filament bulbs are generally adopted in the design of the majority of car interior lamps; however, because tungsten filament bulbs have a relatively large electrical consumption, and a relatively large amount of heat energy is produced when emitting light, thus, operational life of the tungsten filaments is relatively short. Moreover, the tungsten filament bulbs are easily damaged due to jolting when the car is moving. Hence, LED lamp designs have appeared on the market that consumers can install themselves, primarily using different types of adaptors designed according to configuration of the interior lamp socket structure, whereby electrode terminals of the adaptor are connected to a base plate by means of electric wires, and an LED lamp is installed on the base plate. Such a configuration enables the user to purchase the adaptor and assemble it to the car interior lamp socket, thereby converting the car interior lamp into an LED lamp configuration. Although this is an improvement on the shortcomings of tungsten filament bulbs of prior art, and the extreme flexibility in design of LED lamps provides extreme variability in car interior illumination, however, the different manufacturers and models of automobiles results in variation in design of car interior lamp sockets. Lamp sockets used in the current market can be roughly divided into three types, including clip type, twist type and direct insertion type, which lead to the following existent shortcomings in the production and use of the aforementioned LED lamp designs:

1. Because the LED lamp must be combined with various different configurations of adaptors, thus, many varieties of LED lamp product models must be produced. Hence, LED lamps of prior art cannot be manufactured using a single manufacturing process that would improve production efficiency and output control management 2. The change in needs for the various configurations of LED lamp products makes stock control management of the LED lamp products relatively difficult, and the prior art LED lamp designs can only provide a single configuration lamp socket combination for use, which results in suppliers having to bear a relatively high cost in product inventory.

3. Because the LED lamp only provides a single configuration lamp socket plug set for use thereof, when purchasing, a user must first understand the lamp socket configuration being used before purchasing and installing. Moreover, when replacing his automobile, if the lamp socket configuration of the new automobile is different, then the user must purchase another lamp socket, which results in low adaptability of the product, and does not conform to the principle of interchangeability. Moreover, convenience of use is poor.

Hence, from the above it can be known that shortcomings and inconveniences clearly exist in the production and actual use of the aforementioned prior art LED lamp structures, which are in need of improvement.

In light of the shortcomings in structural design of the aforementioned prior art and with the intention to resolve such, the inventor of the present invention, attentively and circumspectly carried out extensive study and exploration to ultimately design a new improved car interior LED lamp adaptor electrical connector structure.

SUMMARY OF THE INVENTION

A primary objective of the present invention is to provide a car interior LED (Light Emitting Diode) lamp adaptor electrical connector structure, which enables users themselves to dismantle and replace a traditional light bulb used in the traditional car interior lamp with an LED lamp product, and use electrical connector terminal structures connected to an LED lamp socket to enable the LED lamp to be assembled and connected to various car interior lamp sockets, thereby effectively resolving the shortcomings and problems of inconvenience brought about by prior art LED lamps.

Another objective of the present invention is to provide the car interior LED lamp adaptor electrical connector structure with improved adaptability to enable achieving optimum control management of production capacity and stock of LED lamp products.

In order to achieve the aforementioned objectives, the present invention is structured to comprise at least one electrical connector terminal, one adaptor wire, one LED lamp board and a lamp board base support. The electrical connector terminals are configured to match the configuration of car interior lamp socket structures. A female socket of an electrical connector socket is embedded in a base of the electrical connector terminal, and electrode pins protruding from a bottom portion of the female socket electrically connect to electrode terminals of the various types of base, thereby fabricating tine electrical connector terminal. The adaptor wires are integrally soldered to an LED lamp board, and a male socket is configured to one end of the adaptor wires, which is able to connect to the female socket of the electrical connector terminal base, or large and small male sockets are respectively configured to two ends of the adaptor wires, which match and connect to the female sockets of the electrical connector terminal and a female socket of the LED lamp board respectively, thereby enabling the adaptor wires to connect to the LED lamp board that embeds onto a plurality of hooks located on a circumferential edge of a lamp board base support. Moreover, the lamp board base support enables separating heat energy produced by the LED lamps on the lamp board from the car interior lamp cover. Furthermore, the present invention provides different configurations of electrical connector terminals to match, assemble and connect to various car interior lamp sockets, thereby effecting an electrical connection and enable emitting of light, thus achieving convenience of use and increasing product adaptability effectiveness.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
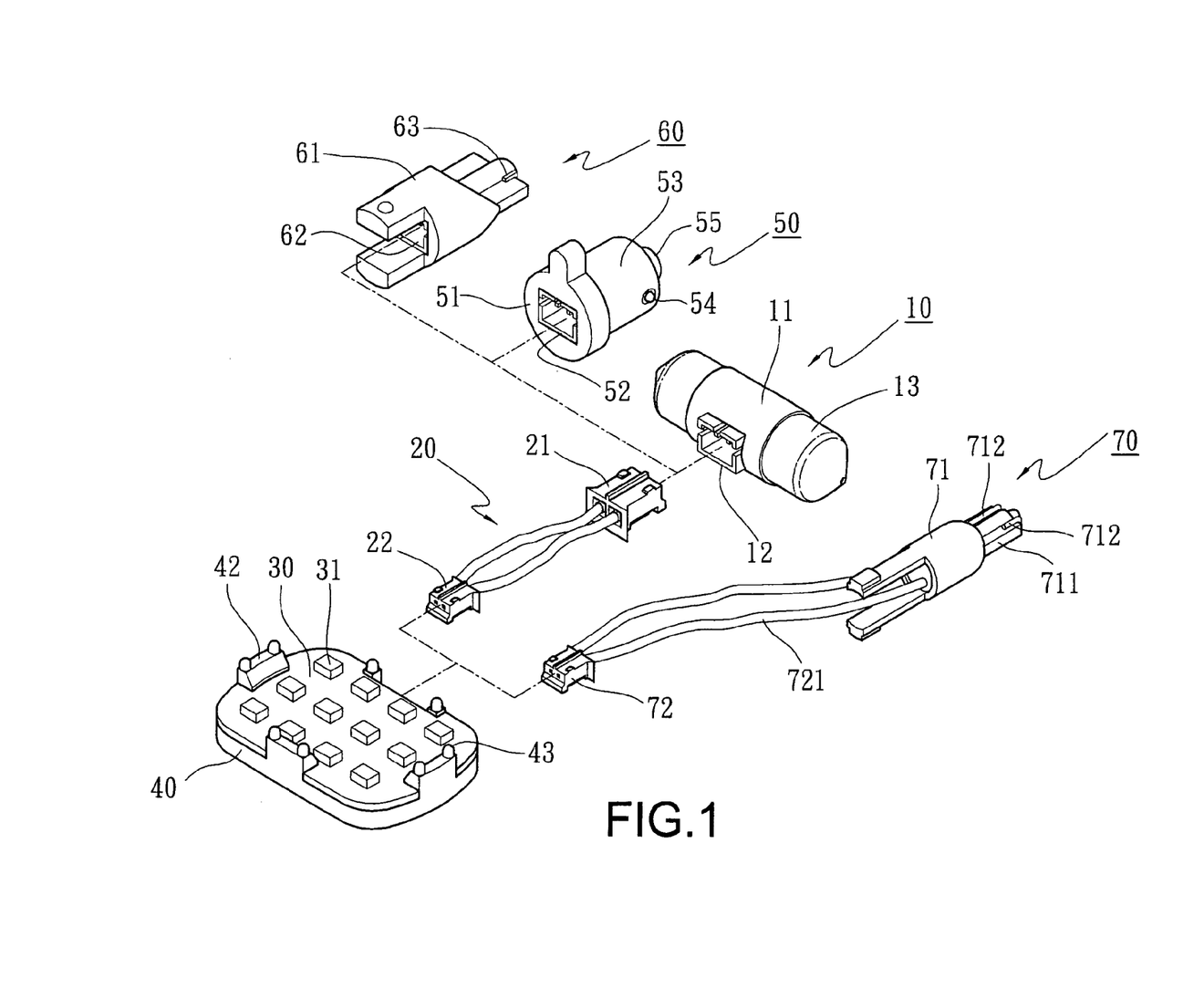
FIG. 1 shows an elevational view depicting structural assembly of each embodiment according to the present invention.

Referring to FIG. 1, which shows a combined schematic view depicting various different embodiments of a car interior LED lamp adaptor electrical connector structure according to the present invention, which is structured to comprise a clip type electrical connector terminal 10, adaptor wires 20, an LED lamp board 30, a lamp board base support 40, a twist type electrical connector terminal 50, a direct insertion type electrical connector terminal 60 and an embedding type electrical connector terminal 70.

Figure 2:
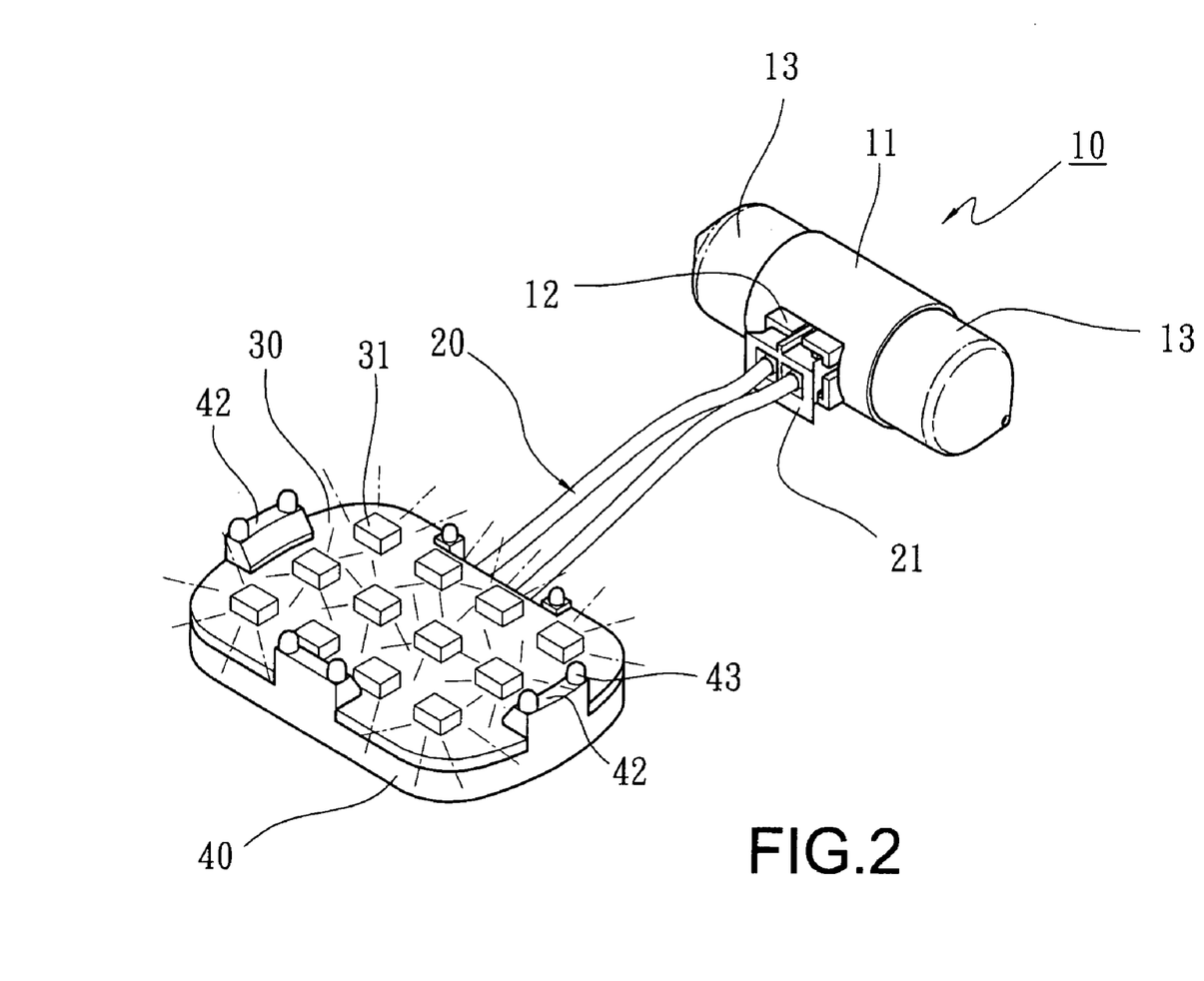
FIG. 2 shows an elevational view depicting structural assembly of a first embodiment according to the present invention.
Figure 3:
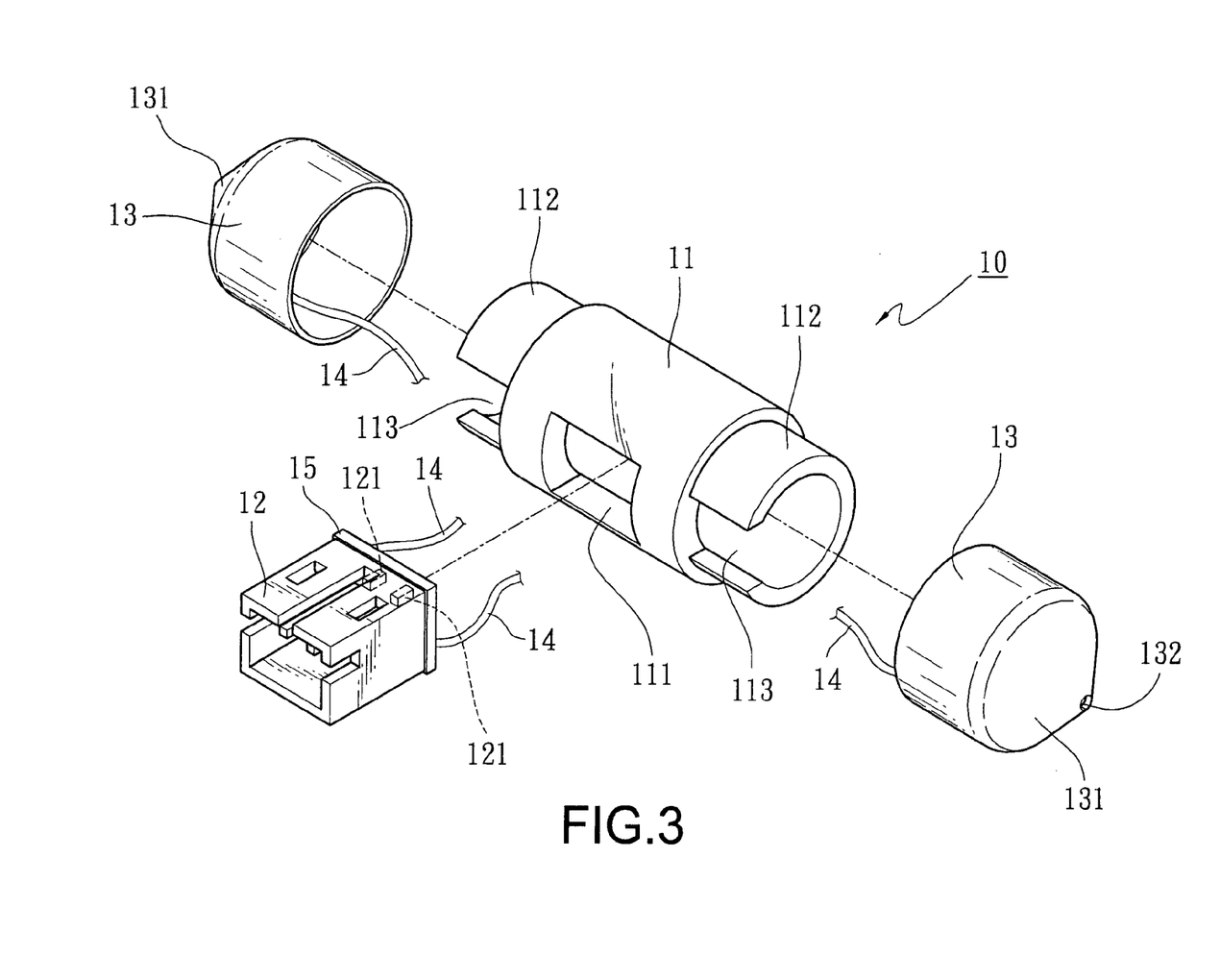
FIG. 3 shows an exploded structural view depicting a clip type electrical connector terminal of the first embodiment according to the present invention.
Figure 4:
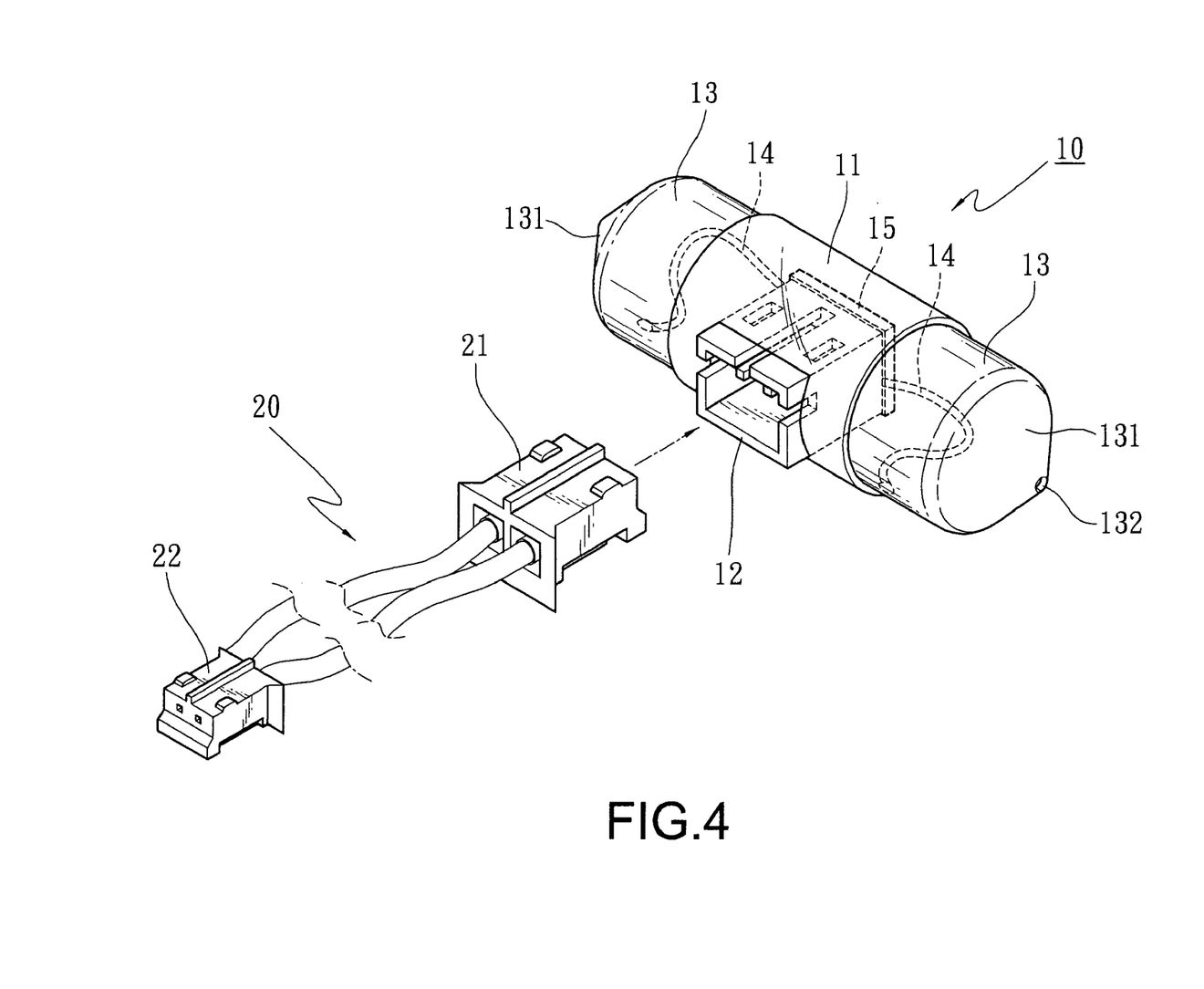
FIG. 4 shows an elevational view depicting the clip type electrical connector terminal of the first embodiment according to the present invention.

Referring to FIGS. 2, 3 and 4, which show the first embodiment of the present invention using the clip type electrical connector terminal 10 structure for a clip type lamp socket, wherein the clip type electrical connector terminal 10 is structured to comprise a base 11, a female socket 12 of an electrical connecting base and metallic caps 13.

The base 11 is of hollow cylindrical form, in an outer surface of which is defined a recess 111. The female socket 12 of the electrical connecting base is embedded within the recess 111, and positive and negative electrode pins 121 protruding from a bottom portion of the female socket 12 are connected to a printed circuit board (PCB) 15, and are then electrically connected to respective inner side edges of the two metallic caps 13 using electric wires 14, and the metallic caps 13 are fitted onto respective holding portions 112 located on side ends of the base 11. A slot 113 is defined on each of the holding portions 112, which enable avoiding soldered areas of inner edges of the metallic caps 13 when fitting onto the holding portions 112. In addition, an end surface of each of the metallic caps 13 can assume an oblique cone form 131, a top end of which is defined a through hole 132. If the electric wires 14 are passed through the through holes 132, they can then be soldered and connected externally to an outer surface of the metallic caps 13 to complete assembly of the clip type electrical connector terminal 10 without the need for defining the slots 113 in the holding portions 112, and the electric wires 14 do not need to be soldered to the inner side edges of the metallic caps 13 while still achieving complete assembly of the clip type electrical connector terminal 10.

A relatively larger male socket 21, configured to match the aforementioned electrical connector female socket 12, is fitted to one end of the adaptor wires 20, and a male socket 22 of relatively smaller dimensions is fitted to another end of the adaptor wires 20.

Figure 5:
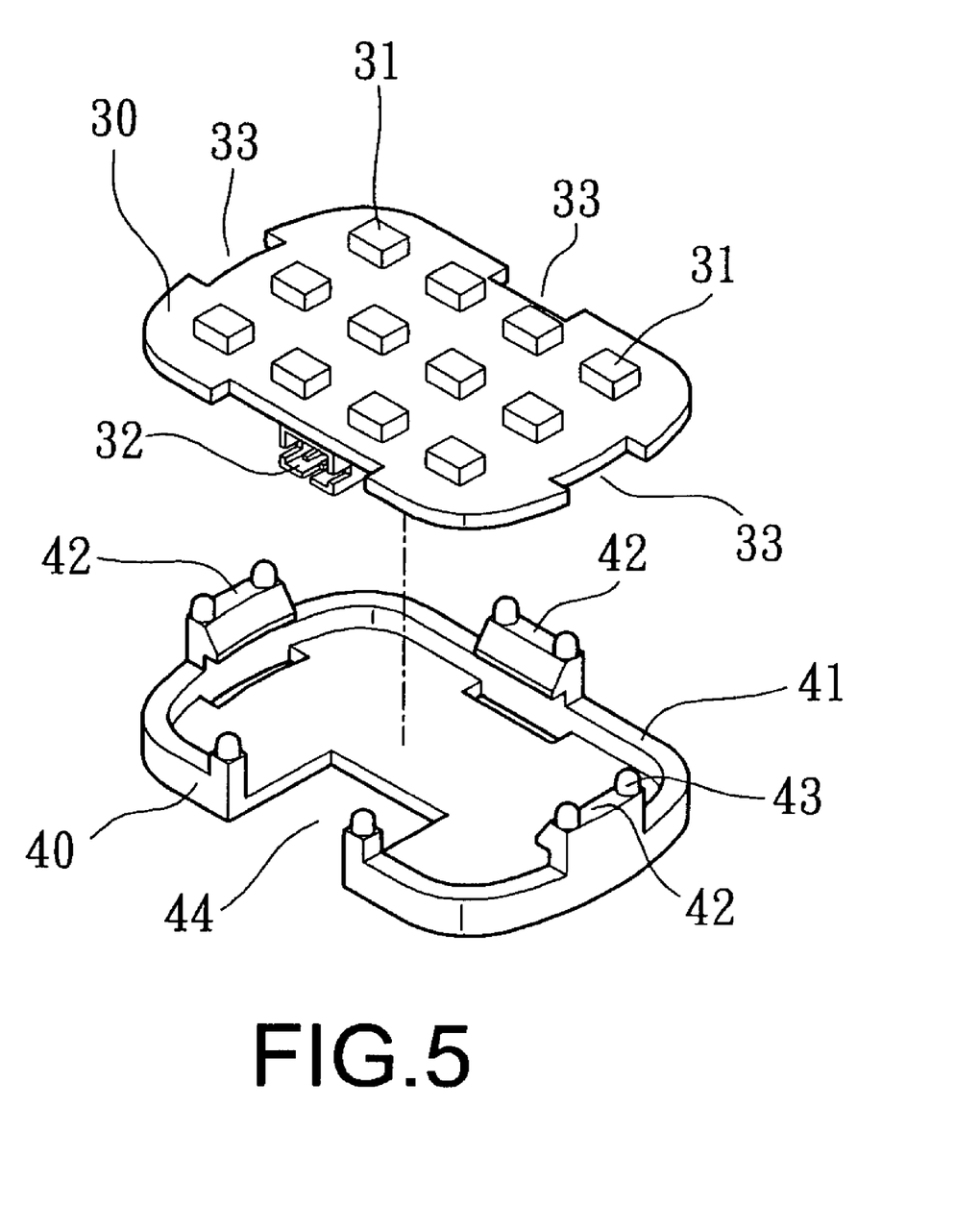
FIG. 5 shows an elevational view depicting a first embodiment of a lamp board base support according to the present invention.

Referring to FIG. 5, which shows the LED lamp board 30, a top surface of which is configured with a plurality of LED lamps 31, and a relatively small female socket 32 is soldered to a bottom portion of the LED lamp board 30, which enables the relatively small male socket 22 of the adaptor wires 20 to plug therein. Moreover, the embodiment shown in FIG. 5 depicts a plurality of notches 33 defined on a periphery of the LED lamp board 30.

A protruding edge 41 is formed on a periphery of the lamp board base support 40, and hooks 42 are formed on a top surface of the protruding edge 41. Protruding posts 43 are formed on a top end of each of the hooks 42. A notch 44 is defined in a bottom portion of the lamp board base support 40, which provides for the relatively small female socket 32 of the bottom portion of the LED lamp board 30 to be disposed therein.

Accordingly, the LED lamp board 30 is clip fastened onto the lamp board base support 40 by respectively fastening the hooks 42 into the notches 33 of the periphery of the LED lamp board 30. The relatively large male socket 21 on one end of the adaptor wires 20 is plugged into the female socket 12 of the clip type electrical connector terminal 10, and the relatively small male socket 22 on the other end of the adaptor wires 20 is plugged into the relatively small female socket 32 of the LED lamp board 30. Then, the clip type electrical connector terminal 10 is assembled and connected to a car interior lamp socket; thereby effecting an electrical connection and emitting of light, and converting the car interior lamp into a LED lamp for use thereof (see FIG. 13).

Figure 6:
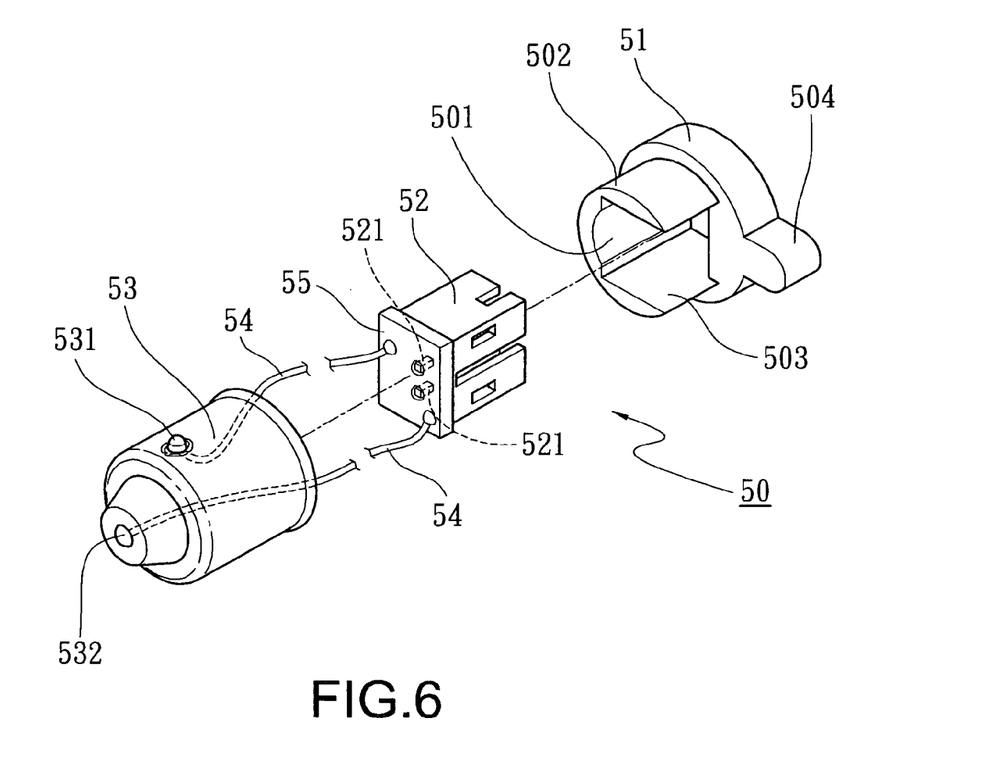
FIG. 6 shows an exploded structural view depicting a twist type electrical connector terminal of a second embodiment according to the present invention.
Figure 7:
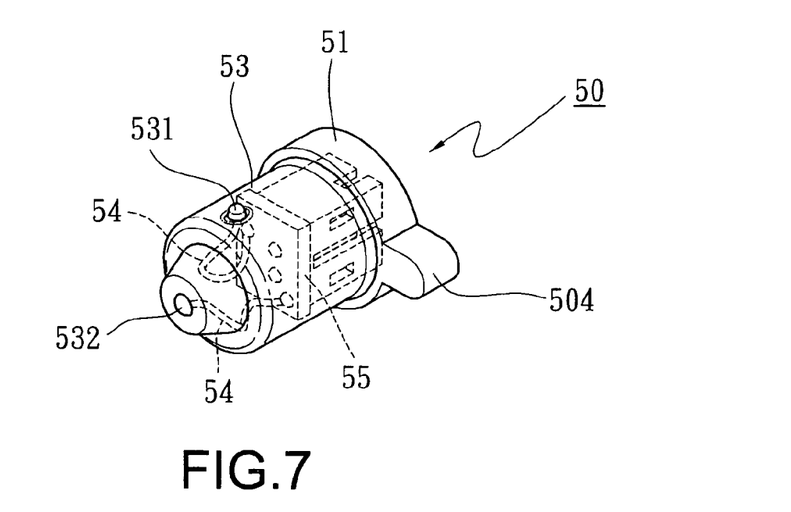
FIG. 7 shows an elevational view depicting the twist type electrical connector terminal of the second embodiment according to the present invention.

Referring to FIGS. 6 and 7, which show the second embodiment of the present invention using the twist type electrical connector terminal 50, wherein the twist type electrical connector terminal 50 is structured to comprise a base 51, a female socket 52, a twist type cap 53 and internally connected electric wires 54.

A cavity 501 is defined within the base 51, and the female socket 52 of a connecting socket is embedded within the cavity 501. Moreover, two positive and negative electrode pins 521 protrude from a bottom end of the base 52 and insert into a printed circuit board (PCB) 55, and are then electrically connected to two electrode connecting points 531, 532 of the twist type cap 53 that is fitted onto a holding portion 502 formed at an end portion of the base 51. Grooves 503 are defined on the holding portion 502, which enable avoiding the electrode connecting point 531 of the inner surface of the twist type cap 53 when fitting on the holding portion 502. In addition, a protruding rib 504 protrudes from an outer edge of the base 51, which facilitates a user in grasping and rotating the base 51 when twist fastening the twist type electrical connector terminal 50. Accordingly, structural assembly of the twist type electrical connector terminal 50 is completed.

Figure 8:
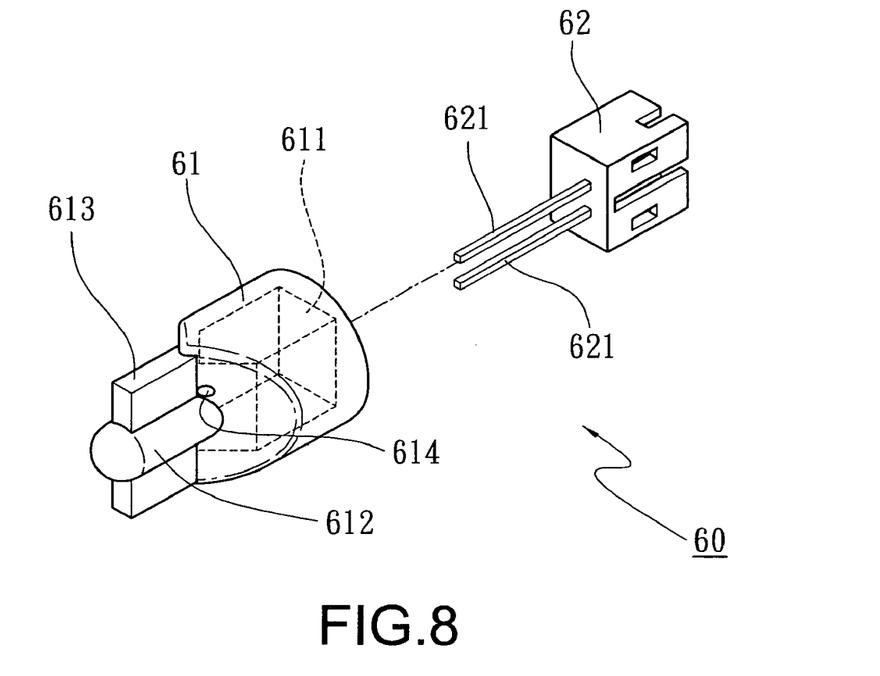
FIG. 8 shows an exploded structural view depicting a direct insertion type electrical connector terminal of a third embodiment according to the present invention.
Figure 9:
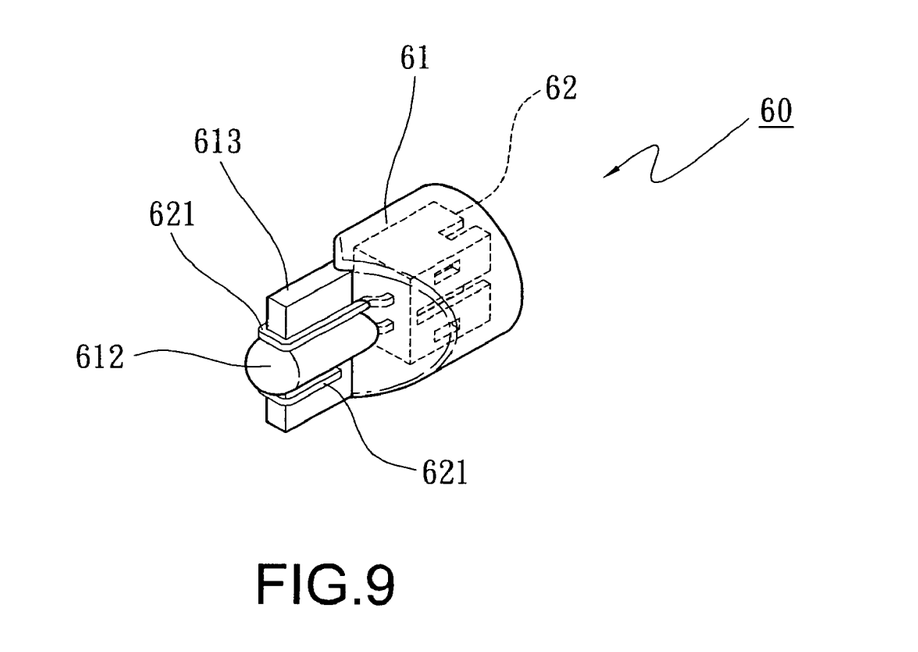
FIG. 9 shows an elevational view depicting the direct insertion type electrical connector terminal of the third embodiment according to the present invention.

Referring to FIGS. 8 and 9, which show the third embodiment of the present invention using the direct insertion electrical connector terminal 60, wherein the direct insertion electrical connector terminal 60 is structured to comprise a main body 61 and a female socket 62.

A holding cavity 611 is defined in a bottom end of the main body 61, which provides for embedding the female socket 62 of a connecting socket therein. An inserting portion 612 is formed on a top end of the main body 61, which matches a direct insertion lamp socket, and through holes 614, which penetrate to the holding cavity 611, are respectively defined at diagonal positions of two side bottom ends of ribs 613 of the inserting portion 612. Moreover, positive and negative electrode pins 621 protruding from a bottom end of the base 62 respectively penetrate the through holes 614 of the ribs 613, and are respectively kinked so as to come up against side walls of the ribs 613 of the inserting portion 612, thereby enabling electrical connection with electrode terminals of a car interior direct insertion lamp socket. Accordingly, structural assembly of the direct insertion type electrical connector terminal 60 is completed.

Figure 10:
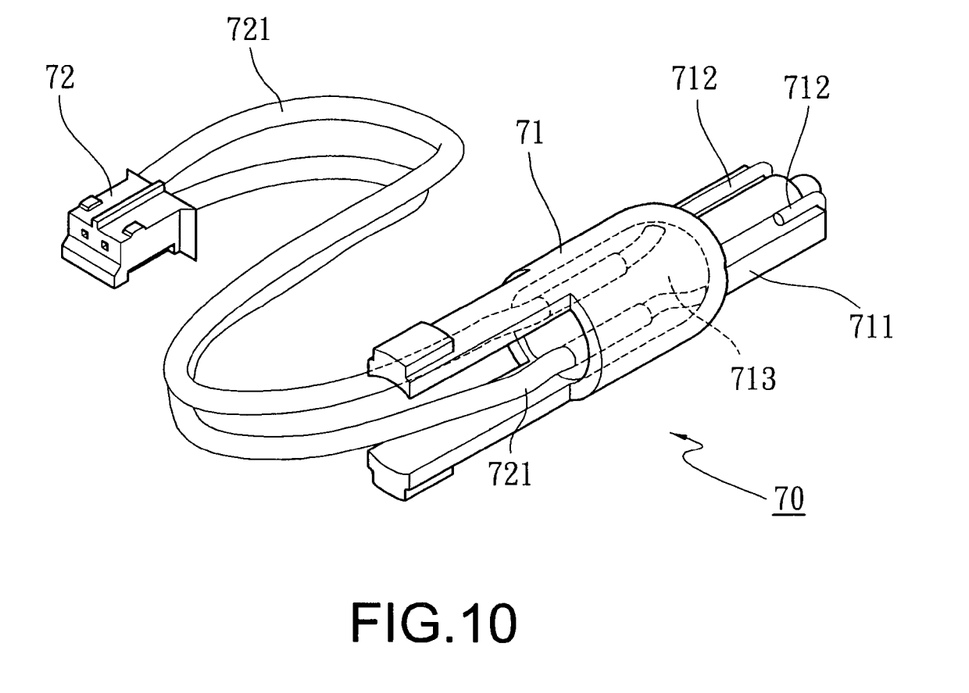
FIG. 10 shows an elevational view depicting an embedding type electrical connector terminal of a fourth embodiment according to the present invention.

Referring to FIG. 10, which shows the fourth embodiment of the present invention using the embedding type electrical connector terminal 70 applicable for use in an embedding type lamp socket of relatively small size, wherein the embedding type electrical connector terminal 70 is primarily structured to comprise a molded base 71 and a relatively small male socket 72 integrally connected thereto. An embedding portion 711 is formed at a rear portion of the molded base 71, and positive and negative electrode pins 712, which penetrate to a holding cavity 713 defined within the molded base 72, are respectively located at diagonal positions of the embedding portion 711, which enable electrical connection with electrodes of a car interior embedding type lamp socket. Ends of the pins 712 that penetrate to the holding cavity 713 are electrically connect to the relatively small male socket 72 using electric wires 721, and are fixedly sealed within the holding cavity 713. Accordingly, structural assembly of the embedding type electrical connector terminal 70 is completed, thereby enabling the pins 712 to be plugged into a car interior embedding type lamp socket, while the relatively small male socket 72 at another end of the electric wires 721 is directly connected to the relatively small female socket 32 of the LED lamp board 30, thereby eliminating the need to use the adaptor wires 20 for connection while still enabling connecting the car interior lamp socket to the LED lamp board 30 for use thereof.

Figure 13:
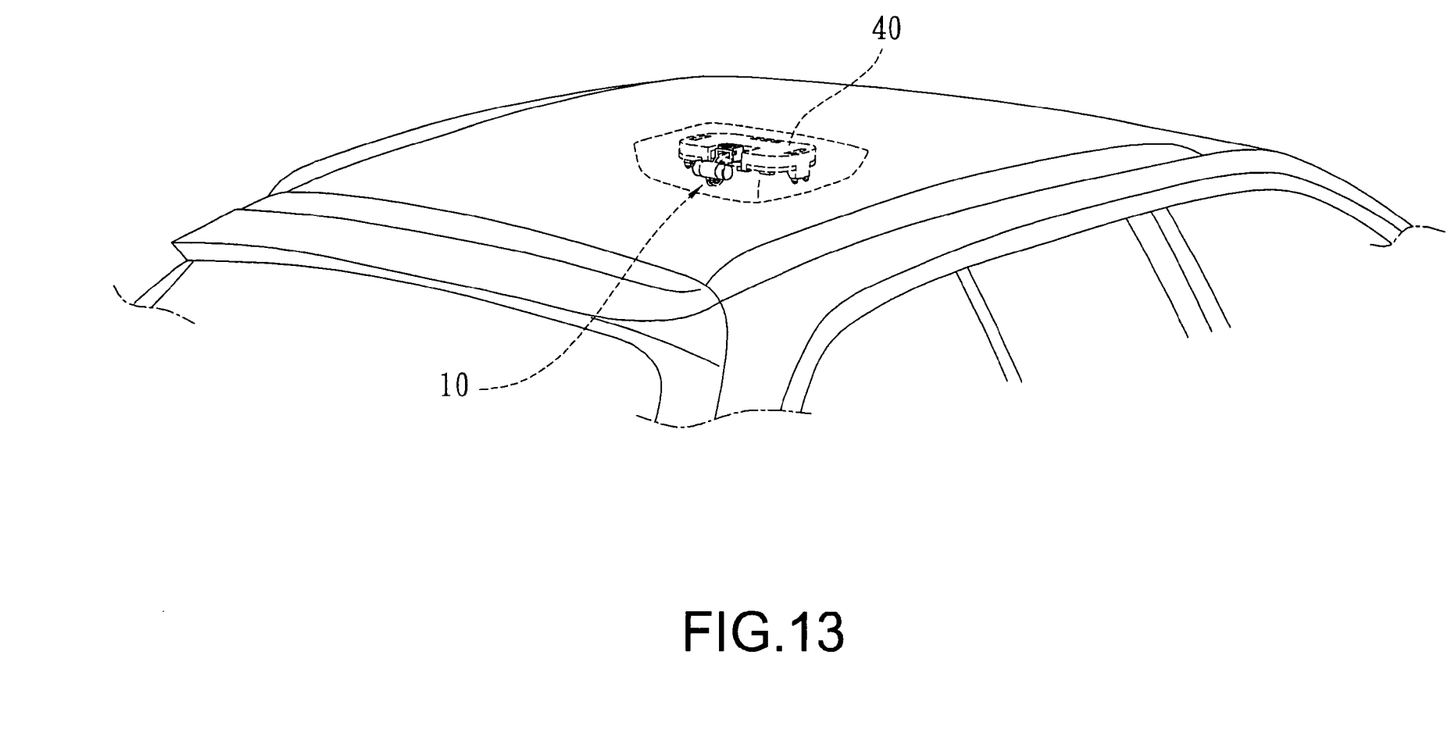
FIG. 13 shows a schematic view depicting a first embodiment of the present invention in use.

With the aforementioned embodiments, when it is desired to replace the car interior lamp and install a light source that uses an LED lamp to emit illumination, a user needs only to dismantle the light bulb from the original car interior lamp, and select the appropriate electrical connector terminal configuration from the four embodiments disclosed in the present invention according to the form of the light bulb dismantled from the original lamp socket, and connect it to the car interior lamp socket, then the adaptor wires 20 are used to connect to the LED lamp board 30 configured with the LED lamps 31 embedded on the LED lamp board base support 40, or the relatively small male socket 72 of the electrical connector terminal 70 is directly embedded and connected to the lamp board base support 40, thereby achieving effectiveness to provide greater brightness to the car interior while saving on electrical power (see FIG. 13). The majority of general car interior light bulb socket configurations are covered by the clip type electrical connector terminal 10 of the first embodiment or the twist type electrical connector terminal 50 of the second embodiment or the direct insertion type electrical connector terminal 60 of the third embodiment or the embedding type electrical connector terminal 70 of the fourth embodiment. Hence, the car interior LED lamp adaptor electrical connector structure of the present invention includes all assembly components as depicted in FIG. 1 when sold as a product on the market, and is thus .provided with high adaptability for use with the different manufacturers and models of automobiles.

Referring to FIG. 5, the lamp board base support 40 shown is necessary for embedding the LED lamp board 30 thereto, and the protruding posts 43 formed on the lamp board base support 40 are used to separate the heat energy produced by the LED lamps 31 when emitting light from the lamp cover of the car interior lamp, thereby protecting the car interior lamp cover and functionality thereof. Hence, different types of the lamp board base support 40 can be designed according to effectiveness required.

Figure 11:
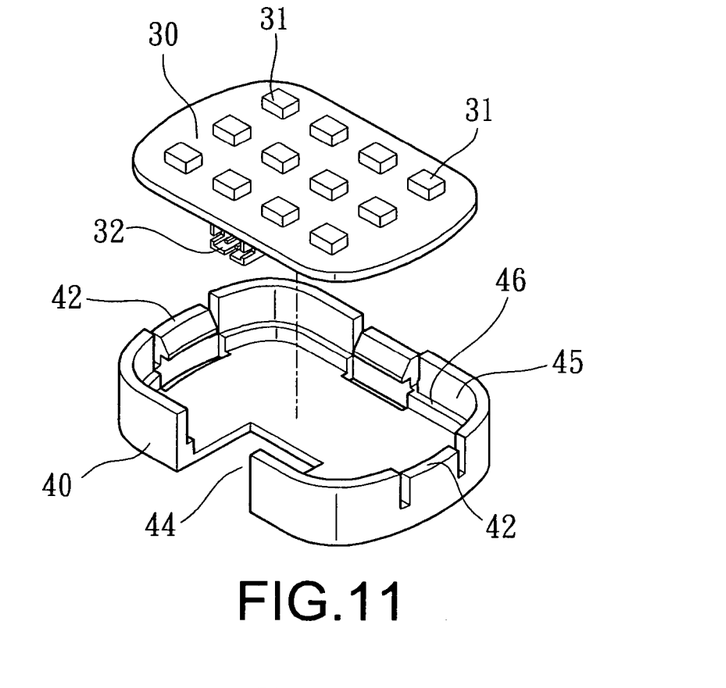
FIG. 11 shows a structural elevational view depicting a second embodiment of the lamp board base support according to the present invention.

Referring to FIG. 11, which shows the lamp board base support 40 of the second embodiment, wherein an elevated protruding edge 45 is formed on a periphery thereof. A stepped groove 46 is defined on an inner side of the protruding edge 45 corresponding to an outer edge of the LED lamp board 30. The hooks 42 are formed on a circumferential edge of the protruding edge 45, and the notch 44 is defined in a bottom portion of the lamp board base support 40. The LED lamp board 30 can be embedded within the stepped groove 46, and the hooks 42 of the elevated protruding edge 45 enable separating the LED lamps 31 from the lamp cover of the car interior lamp.

Figure 12:
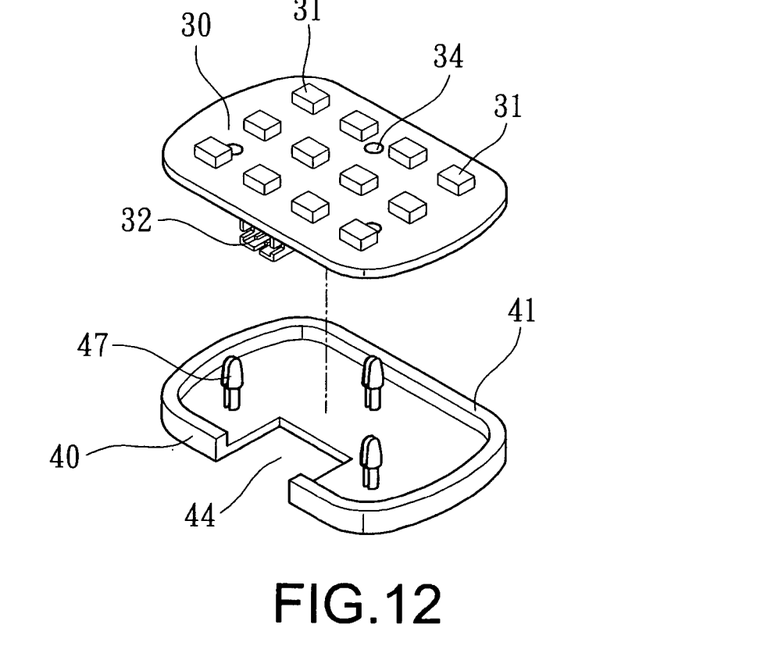
FIG. 12 shows a structural elevational view depicting a third embodiment of the lamp board base support according to the present invention.

Referring to FIG. 12, which shows the lamp board base support 40 of the third embodiment, wherein the protruding edge 41 is formed on a circumferential edge thereof, and posts 47 having elastic slots protrude from a base plate of the lamp board base support 40. Furthermore, position fixing holes 34 are defined in the LED lamp board 30 corresponding to the posts 47, thereby enabling the posts 47 of the lamp board base support 40 to embed into the position fixing holes 34 and fix position of the LED lamp board 30. A spacing is formed between the ends of the posts 47 and the LED lamp board 30, which separates the car interior lamp cover from the LED lamps 31.

Figure 14:
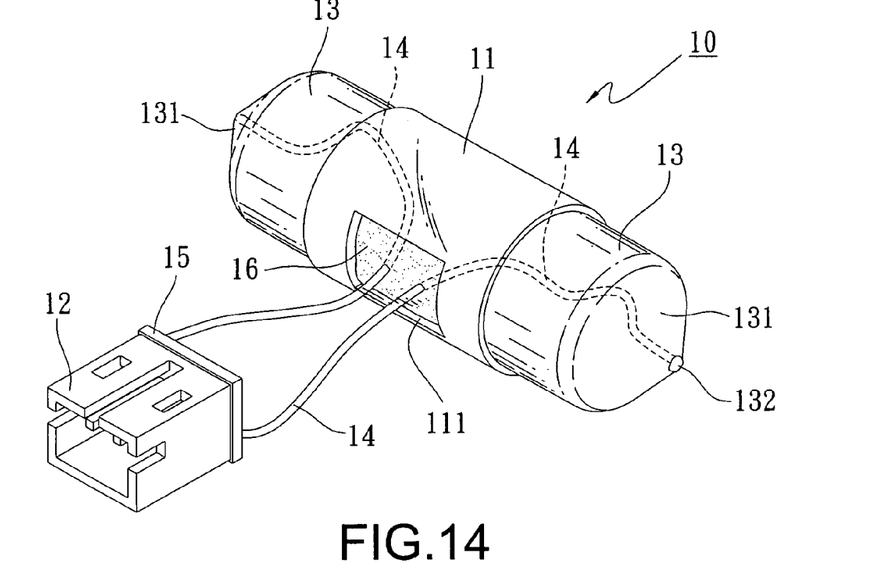
FIG. 14 shows another elevational view of the clip type electrical connector terminal according to the present invention.
Figure 15:
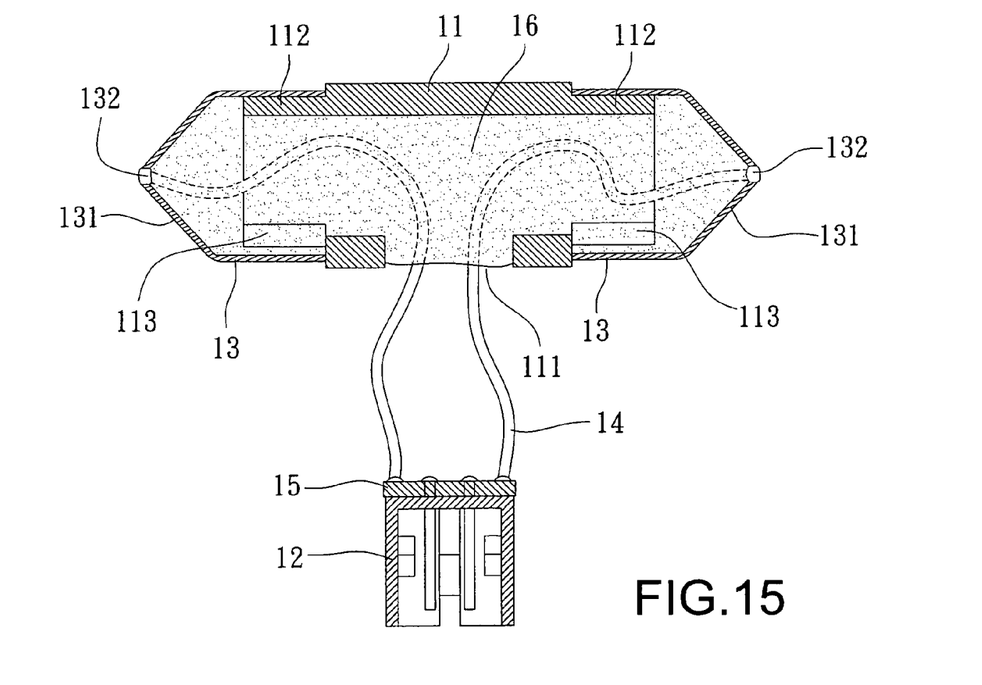
FIG. 15 shows a cutaway view of the clip type electrical connector terminal of FIG. 14 according to the present invention.

Referring to FIGS. 14 and 15, according to the structural configuration of the clip type electrical connector terminal 10 of the first embodiment, the internal electric wires 14 can be elongated to enable exposing the female socket 12, as depicted in the figures, and then insulating cement can be injected within the base 11, similarly enabling the clip type electrical connector terminal 10 to be connected to the adaptor wires 20.

In conclusion, the simple innovative design of the present invention enables the LED lamp board 30 to connect to any of the electrical connector terminals as disclosed above and be assembled and electrically connected to a variety of car interior lamp sockets to effect emitting of light. Hence, the present invention effectively resolves problems of inconvenience and shortcomings of prior art LED lamp boards caused by them only being able to be used with a pre-designed single lamp socket, and provides a more convenient and more practical configuration.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A car interior LED (Light Emitting Diode) lamp adaptor electrical connector structure comprising:
   a) a plurality of electrical connector terminals including a clip type electrical connector terminal, a twist type electrical connector terminal and a direct insertion type electrical connector terminal, each of the plurality of electrical connector terminals having a female socket;
   b) an LED lamp board having a plurality of LED lamps configured on a surface of a printed circuit board; and
   c) adaptor wires having first ends connected to the LED lamp board and second ends connected to one of the plurality of electrical connector terminals.

2. The car interior LED lamp adaptor electrical connector structure according to claim 1, further comprising a lamp board base support having a circumferential edge having hooks enabling the LED lamp board to embed and hook fasten onto the lamp board base support.

3. The car interior LED lamp adaptor electrical connector structure according to claim 1, wherein the electrical connector terminal is a clip type electrical connector terminal, a metallic cap is located on each of the two side ends of the base, and electric wires connected to the electrode pins of the bottom end of the female socket are respectively fixed to inner surfaces of the metallic caps.

4. The car interior LED lamp adaptor electrical connector structure according to claim 3, wherein positive and negative electrode pins protruding from the bottom end of a female socket of the clip type electrical connector terminal are connected to a printed circuit board (PCB), and are then electrically connected to inner side surfaces of the two metallic caps.

5. The car interior LED lamp adaptor electrical connector structure according to claim 1, wherein a protruding edge is formed on a circumferential edge of the lamp board base support, and a stepped groove is defined on an inner side of the protruding edge corresponding to the peripheral edge of the LED lamp board; a plurality of hooks are formed on the circumferential edge, and a plurality of protruding posts are formed on a top end of each of the hooks; moreover, a notch is defined in a bottom portion of the lamp board base support.

6. The car interior LED lamp adaptor electrical connector structure according to claim 1, wherein a plurality of posts having elastic slots protrude from a base plate of the lamp board base support, furthermore, position fixing holes are defined in the LED lamp board corresponding to the posts, thereby enabling the position fixing holes to embed onto the posts of the lamp board base support to fix position of the LED lamp board thereon.

7. The car interior LED lamp adaptor electrical connector structure according to claim 1, wherein the electrical connector terminal is a twist type electrical connector terminal comprising a base, within which is embedded a female socket of a electrical connecting socket, and positive and negative electrode pins protrude from a bottom end of the female socket, which enable electrical connection to electrode connecting points of a twist type cap that is disposed on an end portion of the base.

8. The car interior LED lamp adaptor electrical connector structure according to claim 7, wherein positive and negative electrode pins protruding from the bottom end of the female socket of the twist type electrical connector terminal are connected to a printed circuit board (PCB), and are then electrically connected to two electrode connecting points of the twist type cap.

9. The car interior LED lamp adaptor electrical connector structure according to claim 1, wherein the electrical connector terminal is a direct insertion type electrical connector terminal, which is configured to match a direct insertion lamp socket, wherein a female socket of a connecting socket is embedded within a molded base, and positive and negative electrode pins protruding from a bottom end of the female socket are respectively kinked so as to come up against side walls of ribs of a rear portion of the molded base.

10. The car interior LED lamp adaptor electrical connector structure according to claim 1, wherein one end of the adaptor wires are connected to the electrical connector terminal, the other end of the adaptor wires are configured to a relatively small male socket; wherein the relatively small female socket of the electrical connecting socket is disposed on the LED lamp board.

11. The car interior LED lamp adaptor electrical connector structure according to claim 10, wherein the electrical connector terminal is an embedding type electrical connector terminal, comprising a molded base having a holding cavity, a embedding portion is formed at a rear portion of the molded base, and pins, which penetrate to the holding cavity defined within the molded base are electrically connected to the relatively small male socket and are fixedly sealed within the holding cavity.

12. The car interior LED lamp adaptor electrical connector structure according to claim 1, wherein the electrical connector terminal is a twist type electrical connector terminal comprising a base, within which enables electrical connection to electrode connecting points of a twist type cap that is disposed on an end portion of the base.

* * * * *